Figure 1:
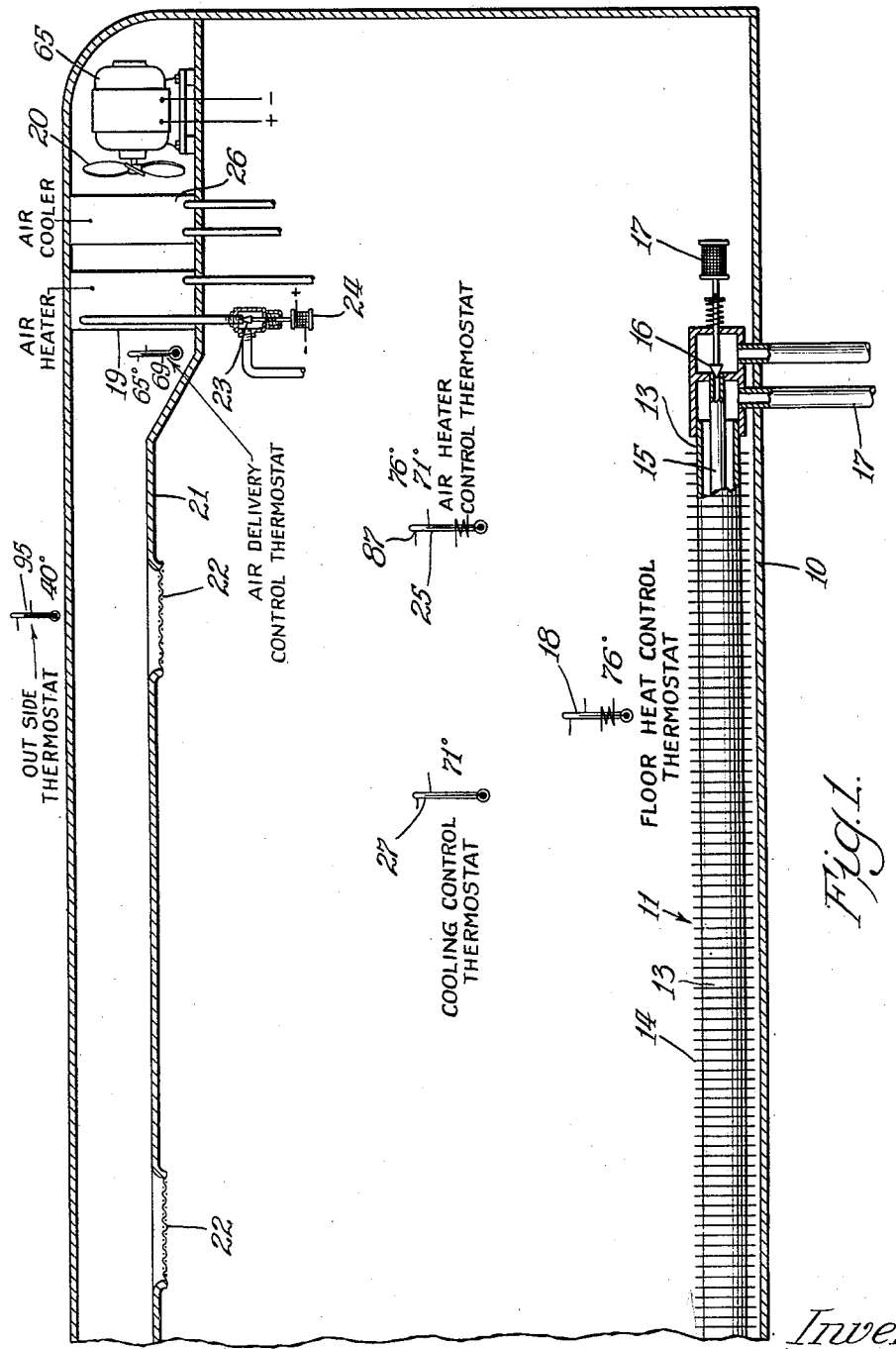

Jan. 17, 1950     T. J. LEHANE     2,494,624
AUTOMATIC TEMPERATURE CONTROL APPARATUS
Filed May 20, 1946     2 Sheets-Sheet 2

Inventor:
Timothy J. Lehane
By Harvey M. Gillespie.
Atty.

Patented Jan. 17, 1950

2,494,624

UNITED STATES PATENT OFFICE 2,494,624

AUTOMATIC TEMPERATURE CONTROL APPARATUS

Timothy J. Lehane, Chicago, Ill., assignor, by mesne assignments, to Vapor Heating Corporation, a corporation of Delaware Application May 20, 1946, Serial No. 670,993

9 Claims. (Cl. 257—3)

This invention relates to improvements in automatic temperature control apparatus embodying means adapted to function under predetermined conditions to deliver heat into an enclosed space or to withdraw heat therefrom so as to maintain desirable temperature conditions in the space.

Temperature control apparatus embodying both heating and cooling means presents a somewhat difficult automatic control problem since the functional setting of the element for controlling the heating means, under certain conditions of operation, is normally higher than the preferred temperature setting of the control element for starting operations of the cooling means. For example, under certain conditions, during the heating cycle of such apparatus, it is desirable to maintain the controlled space at a predetermined temperature, for example 76° Fahrenheit. However, when conditions are such as to require cooling of the space, it is desirable to start the operation of the cooling means at a lower temperature, for example 71° F. It will be seen, therefore, that the optimum control setting of the controls for the heating and the cooling means overlap with relation to each other.

It has been heretofore proposed to overcome the above difficulty by simultaneously operating both the heating and the cooling means during such overlap of the temperature settings, but such proposal involves the operation of the heating and the cooling means in opposition to each other. For example, when conditions are such as to require maximum heat output to maintain the desired temperature, for example said 76° F., the cooling means will oppose the heating means above the temperature of 71° F.

The basic object of the present invention is to provide an automatic temperature control apparatus which permits overlapped temperature settings of the controls for heating means and the cooling means, but which will avoid operation of the heating means and the cooling means in opposition to each other during such overlap of the temperature settings of their controls.

According to the principle of the present invention, either the heating means or the cooling means, as the case may be, is made ineffective when its function is not required to maintain the space being controlled at the desired temperature. It is, therefore, a specific object of the present invention to provide novel and improved means which are automatically effective to control the operations of the heating and the cooling means but which will render the heating means or the cooling means ineffective, as conditions may require, to maintain the space at the desired temperature.

A further object of the invention is to provide a temperature control apparatus of the above general character in which the heating means includes a means for delivering heat directly into the space whose temperature is being controlled and an air circulating means which is employed during one phase of the heating cycle, to deliver heated air into the enclosed space; the latter means being available also during the cooling phase of the apparatus to deliver cooled air into the space.

Another object of the invention is to provide novel and improved control devices which are cooperatively connected so as to function, during one phase of the heating cycle, to deliver heating medium to parts of the heating means so as to maintain a low temperature within the controlled space and to deenergize the air circulating means during this phase of the heating cycle.

Another object of the invention is to provide control means which is automatically effective during the air heating cycle of the apparatus to interrupt the operation of the air delivery means when the temperature of the air stream delivered falls below a predetermined temperature, but which control is rendered ineffective during the operation of the cooling means, whereby the air delivered into the space during the operation of the cooling means may have a temperature substantially below the temperature setting of the device for controlling the delivery of heated air.

Figure 2:
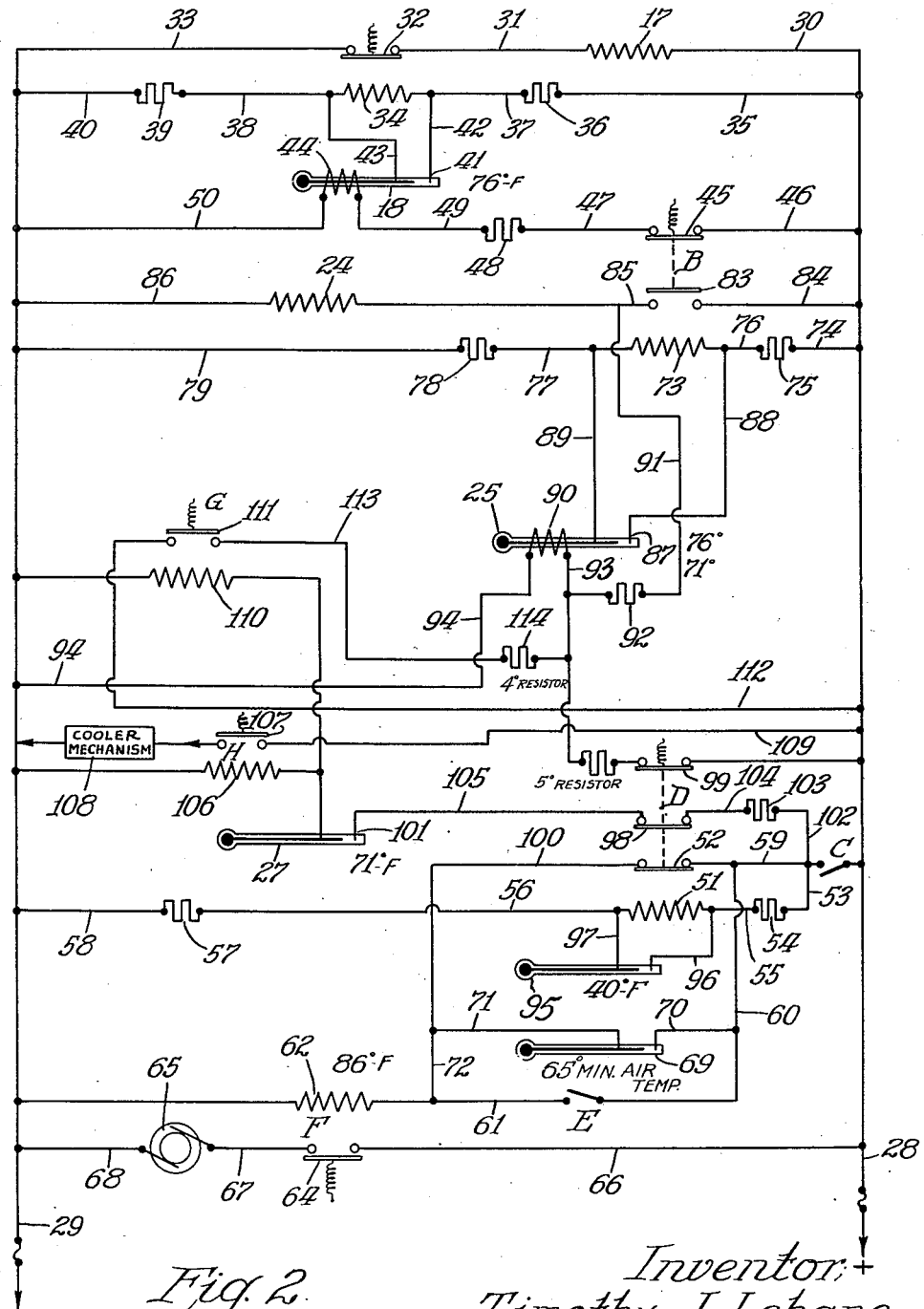

The invention is illustrated in the accompanying drawings wherein:

Fig. 1 is a diagrammatic illustration of a temperature control apparatus of the present invention in a railway car, and, Fig. 2 is a diagram of the electric circuits for controlling the heating and cooling means of the apparatus.

The invention is illustrated in connection with a railway passenger car, but the specific use herein shown is intended merely for purpose of illustration and not as a limitation.

Referring first to Fig. 1 of the drawing: 10 designates one end portion of a railway car provided with one or more radiators 11 arranged near the floor of the car for delivering heat directly into the enclosed space 12 of the car. The radiator 11 may be of any suitable or preferred construction. However, for the purpose of the present illustration, the radiator is composed of an outer pipe 13 provided with heat dissipating fins 14 thereon and an inner feed pipe 15. The delivery of heating medium (steam or hot water) to the inner pipe 15 is controlled by a normally open valve 16 which is closed by the energization of a solenoid 17 to shut off the supply of heating medium to the inner pipe 15. The steam passes from the outer end of the inner pipe 15 into the outer pipe 13 and the condensate is discharged through the return pipe 17. The energization of the solenoid 17 is controlled by a floor heat thermostat 18.

The heating means for the space includes also an overhead radiator 19 and an electrically energized air circulating device 20 for delivering heated air into the space 12. The radiator 19 and the air delivering means 20 are preferably located in an over-head duct 21 extending substantially the full length of the space 12. Outlet openings 22 are provided at spaced locations for the delivery of heated air into the enclosed space. The supply of heating medium to the over-head radiator 19 is controlled by a normally closed valve 23 which is opened to admit heating medium into the radiator by the energization of a solenoid 24. The energization of the valve solenoid 24 is controlled by a thermostat 25 responsive to temperature changes at substantially the breathing level within the space 12.

The cooling means of the apparatus is designated in Fig. 1 by the reference numeral 26 and is located in the duct 21 intermediate the radiator 19 and the air circulating device 20. The operation of the cooling means is controlled by a thermostat 27 which is responsive to the temperate changes at substantially the breathing level within the space 12.

During the heating cycle of the apparatus, when the car is out of service, it is desirable to deliver heating medium to the floor radiator 11 so as to maintain a low temperature within the space 12 sufficient to prevent freezing. It is also desirable to deliver heating medium to the over-head radiator 19 so as to avoid freezing of water entrapped therein, but the air circulating means, during this heating period, is normally deenergized. Consequently, the heat delivered into the space 12 is derived principally from the floor radiators 11. The thermostat 18 for controlling the floor radiators is set, in the present example, to function at 76° F., but the heating area of the floor radiators are normally insufficient to maintain the temperature of 76° F. within the space when the outside temperature is below 40° F. The over-head radiator 19 and the associated air delivery means 20 cooperate with the floor radiators to maintain the temperature at substantially the breathing level within the space at a temperature of 76° F. when the outside temperature is below 40° F. During this period of the heating cycle, the cooling means of the apparatus is rendered ineffective. However, when the outside temperature stands at or above 40° F., the cooling means is available for delivering cooled air into the space 12 when the temperature of the space reaches a predetermined point, for example 71° F. In order to avoid operation of the heating means (both floor and over-head radiators) 5° of auxiliary heat is applied to the over-head heater thermostat 25 so as to adjust its functional setting to 71° F. It will be seen, therefore, that when the outside temperature stands at or above 40° F. and the inside temperature stands at 71° F., the heating thermostat 25 and the cooling thermostat 27 will have the same functional setting of 71° F. However, as soon as the cooling thermostat 27 functions, a relay is actuated to add additional auxiliary heat to the heat control thermostat 25 and to open a relay normally controlled by said thermostat 25, and thereby prevent the delivery of heating medium to the radiator 19. The opening of the circuit to deenergize the coil 24 and close the valve 23 of the over-head radiator also functions to close an auxiliary heater circuit for the floor heater thermostat 18 so as to adjust its functional setting sufficiently low to prevent opening of the floor radiator valve 16 during the cooling cycle of the apparatus.

The electric circuits and the temperature controlled devices for controlling the heating and the cooling means of the apparatus are shown in Fig. 2 of the drawings. The several circuit making and breaking elements are shown in the position which they normally assume when the circuits are deenergized and the outside temperature is below 40° F.

*Low temperature heating cycle*

The positive line of the electric circuits is designated by the reference numeral 28 and the negative line is designated by the reference numeral 29. When current is applied to the positive and negative lines, a circuit is closed through the normally open floor radiator valve 16 so as to close same by energizattion of the solenoid 17. This circuit leads from the positive line through wire 30, solenoid coil 17, wire 31, normally closed relay 32 and wire 33 to the negative line 29. However, simultaneously with the closing of the above circuit, a circuit will be closed through the coil 34 and open the contact 32 of relay A and thereby deenergize the solenoid 17 and permit the valve 16 to open to admit steam to the radiator 11. This circuit leads from positive line 29 through wire 35, resistance 36, wire 37, relay coil 34, wire 38, resistance 39 and wire 40 to the negative line 29. When the mercury column of thermostat 18 assumes a position to close the outer contact 41 of the thermostat, the electric current for energizing the coil 34 is by-passed around the coil through wires 42, mercury column of thermostat 18 and wire 43 so as to deenergize the coil 34 thereof, permitting the relay to close an energizing circuit through coil 17 and thereby shut off the admission of steam to the floor radiator. The floor thermostat 18 is provided with an electrically energized auxiliary heater 44 which is energized when a relay contact 45 is in the position indicated in Fig. 2. The auxiliary heating circuit leads from the positive line 28 through wire 46, contact 45 of relay B, wire 47, resistance 48, wire 49, auxiliary heater 44, and wire 50 to the negative line 29. The auxiliary heater 44 for thermostat 18 is effective only when the thermostat 25 is satisfied, since the relay B which controls the auxiliary heater circuit is controlled by the thermostat 25.

*Normal heating cycle*

When the space 12 is conditioned for normal occupancy, a switch C is closed so as to energize the air delivery means to deliver heated air into the space 12. The closing of switch C energizes a coil 51 adapted to move all movable contacts of relay D to a position to open the circuits controlled thereby and consequently opens the circuit through the lower contact 52 of said relay D. The energizing circuit for the coil 51 leads from the switch C through wire 53, resistance 54, wire 55, relay coil 51 and thence through wire 56, resistance 57 and wire 58 to the negative line. In order to close an energizing circuit through the air delivery means 20, it is necessary to close a switch E momentarily. The closing of this switch establishes a circuit leading from the switch C, wires 59 and 60 through switch E, wire 61, through relay coil 62 of relay F and thence through wire 63 to the negative line. The energization of coil 62 closes the contact 64 of relay F so as to establish an energizing circuit through the blower motor 65. This energizing circuit leads from positive line 28 through wire 66, closed contact 64, wire 67, motor 65 and wire 68 to the negative line. The switch E is held closed, preferably until the temperature of the air delivered reaches a temperature of 65° F. This is a preferred temperature setting of a blower control thermostat 69 located in the duct 21 and responsive to the temperature of the heated air being delivered. When the thermostat 69 is caused to close its contacts by the rise of the air temperature within the duct 21, it establishes a holding circuit to maintain the relay coil 62 energized. This holding circuit leads from wire 60 through wire 70, mercury column of thermostat 69 and wires 71 and 72 to a connection with wire 61 and thence through coil 62 as previously described. It will now be apparent that the switch E can be opened and that the blower motor 65 will continue to operate as long as the heated air being delivered into the space is maintained at a temperature of 65° F. or higher. However, as soon as the temperature of the heated air falls below 65°, the blower motor circuit is automatically opened so as to discontinue the delivery of air into the space 12.

During the energization of coil 51 of relay D, towit, when the outside temperature is below 40° F., the thermostat 25, for controlling the supply of heating medium to the over-head radiator 19, has a temperature setting of 76° F. It will be seen, therefore, that simultaneously with the closing of the blower motor circuit, a circuit will be closed through coil 73 of relay B. This circuit leads from positive line 28 through wire 74, resistance 75, wire 76, relay coil 73, wire 77, resistance 78, wire 79 to the negative line 29. The energization of said coil 73 actuates the relay B to close its lower contact 83 and thereby establishes an energizing circuit through solenoid 24 to open the valve 23 and thereby deliver heating medium into the over-head radiator 19. This circuit leads from positive line 29 through wire 84, closed contact 83 of relay B, wire 85, coil 24 and wire 86 to the negative line. The relay B will remain closed and consequently, heating medium will be supplied to the radiator 19 until the mercury column of thermostat 25 engages its outer contact 87 to by-pass the current around coil 33. This by-pass circuit leads from wire 76 through wire 88 to contact 87 of thermostat 25, thence through the mercury column of the thermostat to wires 89, 78, resistance 79, wire 80, contact 81 of relay G and wire 82 to the negative line. The by-passing of current around the said coil 73 permits the relay B to assume the position shown in Fig. 2 and, therefore, deenergizes the solenoid 24 of valve 23, whereupon the valve is closed to shut off the supply of steam to radiator 19.

In order to bring about a cycling operation of the valve 26 and to also provide means for adjusting the functional setting of thermostat 25, the said thermostat is provided with an electrically energized auxiliary heater 90. The normal heating circuit for the auxiliary heater 90 is effective only when the lower contact 83 of relay B is closed and consequently when the thermostat 25 is unsatisfied. This energizing circuit leads from wire 85 through wire 91, cycle resistor 92, wire 93, auxiliary heater 90 and wire 94 to the negative line. The circuit is maintained closed only momentarily, when the temperature of the space 12 is near 76° F. Consequently, the valve 23 will be opened and closed at frequent intervals until the temperature of the space reaches 76° F.

*Cooling made available*

When the outside temperature stands at 40° F. or higher, the mercury column of outside thermostat 95 closes the contacts between its inner and outer contacts so as to by-pass electric current around coil 51 and thereby deenergize the said coil and permit the relay D to move to the position indicated in Fig. 2. This by-pass circuit leads from wire 55 through wire 96, mercury column of outside thermostat 95 and wire 97 to wire 56 and thence to the negative line 29. The movement of the relay D to the position indicated in Fig. 2 closes its contacts 52, 98 and 99. The closing of the contact 52 establishes a holding circuit through coil 62 of relay F. This circuit leads from the closed contact 52 of relay D through wire 100 and follows through wire 72, 61 and coil 62 to the negative line. The closing of the lower contact 52 of relay D, therefore, makes the thermostat 69 ineffective to open the relay F. Consequently, when the outside temperature stands at 40° F. or higher, the air delivery means 20 can be operated and air delivered into the space 12 at temperatures substantially below the functional setting of the duct thermostat 69.

The closing of the relay contact 98 of relay D closes a circuit leading to contact 101 of cooler thermostat 27. This circuit leads from switch C through wire 102, resistor 103, wire 104, closed contact 98 of relay D, wire 105 to thermostat contact 101 and thereby makes the said thermostat available to start operations of the cooling means when the temperature of the space reaches 71° F. Simultaneously with the closing of the circuit to make cooler thermostat 27 effective at 71° F., the contact 99 of relay D closes a circuit through a 5° resistor for supplying 5° of additional heat to the auxiliary heater 90 of the over-head heater thermostat 25 and consequently adjusts the said thermostat 25 to a temperature setting of 71° F. to harmonize with the temperature setting of the cooler thermostat 27. Thereafter, the thermostat 25 will function at a temperature of 71° F. at the thermostat until the space temperature adjacent both thermostats 25 and 27 reaches 71° F. As soon as this condition occurs, the mercury column of the cooler thermostat 27 engages the outer contact 101 and establishes an energizing circuit through coil 106 of relay H so as to close contact 107 of said relay and thereby establish an energizing circuit through the operating mechanism 108 for circulating a cooling medium through the cooler 26. This actuating circuit leads from positive line 29 through wire 109, closed contact 107 of relay H, operating mechanism 108 to the negative line 29. Simultaneously with the energization of relay H, the closing of the contacts of cooler thermostat 27 establishes an energizing circuit through coil 110 of relay G so as to close the contact 111 of this relay and thereby establish a circuit for supplying additional heating current to the auxiliary heater 90 of the thermostat 25. This additional heating circuit leads from line 28 through wire 112, closed contact 111 of relay G, wire 113, 4° resistor 114 to wire 93, thence through the auxiliary heater 90 and wire 94 to the negative line 29. By the closing of relay G so as to add 4° of additional heat to the auxiliary heater 90, the thermostat 25 is adjusted to a functional setting of 67° F. The additional heat added to the auxiliary heater 90 through the resistor 114 supplies sufficient residual heat to maintain the thermostat 25 ineffective for a short period of time after the cooling thermostat 27 has broken its contact. However, if the temperature at the cooling thermostat 27 remains below 71° F., until the additional 4° temperature is dissipated from the auxiliary heater 90, the heating means will be then effective to deliver heated air into the space to raise the temperature of the space to 71° F.

I claim:

1. An automatic temperature control apparatus comprising means for delivering heat into an enclosed space, means for controlling the supply of heating medium to the heating means including an electrically operable valve and a temperature sensitive control therefor which is effective at a predetermined maximum temperature within the space to shut off the supply of heating medium; means for delivering air into the enclosed space, means for cooling said air, a temperature sensitive control means set to function at a predetermined temperature of the delivered air to maintain the air delivery means effective, a temperature sensitive control means set to function at a temperature within the space lower than said predetermined maximum for making the air cooling means effective, and a temperature sensitive means for making the last mentioned control means effective and ineffective, respectively, above and below a predetermined outside temperature.

2. An automatic temperature control apparatus comprising means for delivering heat into an enclosed space, means for controlling the supply of heating medium to the heating means including an electrically operable valve and a temperature sensitive control therefor which is effective at a predetermined maximum temperature within the space to shut off the supply of heating medium; means for delivering air into the enclosed space, means for cooling said air, a temperature sensitive control means set to function at a predetermined temperature of the delivered air to maintain the air delivery means effective, a temperature sensitive control means set to function at a temperature within the space lower than said predetermined maximum for making the air cooling means effective, a relay having a contact member for making and breaking a circuit through the last mentioned temperature sensitive means and having also a contact member connected in a circuit for bypassing current around said temperature sensitive control means for maintaining the air delivery means effective, whereby the last two temperature sensitive means are made effective and ineffective, respectively, by opening and closing said relay.

3. An automatic temperature control apparatus comprising means for delivering air into an enclosed space, means for heating the air, means for cooling the air, means including a heat control thermostat responsive to a predetermined maximum temperature within the space for controlling the delivery of heating medium to the air heating means, an auxiliary heater for said heat control thermostat, means including a cooling control thermostat responsive to a predetermined lower temperature within the space for energizing the air cooling means, and means including a thermostat responsive to outside temperatures and a relay controlled thereby for rendering said cooling control thermostat ineffective below a predetermined outside temperature and for closing an energizing circuit through said auxiliary heater to lower the functional setting of the heat control thermostat when the outside temperature rises above said predetermined outside temperature.

4. An automatic temperature control apparatus comprising electrically energized means for delivering air into an enclosed space, means for heating the air, means for cooling the air, means including a heat control thermostat responsive to a predetermined maximum temperature in the space for controlling the delivery of heating medium to the air heating means, means including a cooling control thermostat responsive to a predetermined lower temperature within said space for energizing the air cooling means, a manually operable switch device for closing an energizing circuit through the air delivery means, an air delivery thermostat connected in parallel with the manually operable switch device and responsive to a predetermined temperature of the heated air to maintain the air delivery means effective when the said manually operable switch device is opened while the air delivered is above said predetermined temperature, and means including an outside thermostat operable above a predetermined outside temperature for closing another electrical circuit parallel to said manually operable switch device to energize the air delivery means and to make the said air delivery thermostat ineffective as a control device.

5. An automatic temperature control apparatus comprising electrically energized means for delivering air into an enclosed space, means for heating the air, means for cooling the air, means including a heat control thermostat responsive to a predetermined maximum temperature in the space for controlling the delivery of heating medium to the air heating means, means including a cooling control thermostat responsive to a predetermined lower temperature within said space for energizing the air cooling means, a manually operable switch device for closing an energizing circuit through the air delivery means, an air delivery thermostat connected in parallel with the manually operable switch device and responsive to a predetermined temperature of the heated air to maintain the air delivery means effective when the said manually operable switch device is opened while the air delivered is above said predetermined temperature, a thermostat responsive to the outside temperature, and means controlled by said outside thermostat for adjusting the functional setting of the heat control thermostat to correspond to the functional setting of the cooling control thermostat.

6. An automatic temperature control apparatus comprising electrically energized means for delivering air into an enclosed space, means for heating the air, means for cooling the air, means including a heat control thermostat responsive to a predetermined maximum temperature in the space for controlling the delivery of heating medium to the air heating means, means including a cooling control thermostat responsive to a predetermined lower temperature within said space for energizing the air cooling means, a manually operable switch device for closing an energizing circuit through the air delivery means, an air delivery thermostat connected in parallel with the manually operable switch device and responsive to a predetermined temperature of the heated air to maintain the air delivery means effective when the manually operable switch device is opened and the delivered air is above a predetermined temperature and means including a thermostat responsive to a predetermined outside temperature to close another electrical circuit through the air delivery means and to make the cooling control thermostat available as a control device, and means including an auxiliary electric heater for the heat control thermostat and a relay contact controlled by said outside thermostat for energizing said auxiliary heater, whereby the functional setting of the heat control thermostat is lowered when the cooling control thermostat is made available as a control device.

7. An automatic temperature control apparatus comprising electrically energized means for delivering air into an enclosed space, means for heating the air, means for cooling the air, means including a heat control thermostat responsive to a predetermined maximum temperature in the space for controlling the delivery of heating medium to the air heating means, means including a cooling control thermostat responsive to a predetermined lower temperature within said space for energizing the air cooling means, a manually operable switch device for closing an energizing circuit through the air delivery means, an air delivery thermostat connected in parallel with the manually operable switch device and responsive to a predetermined temperature of the heated air to maintain the air delivery means effective when the manually operable switch device is opened and the delivered air is above a predetermined temperature and means including a thermostat responsive to a predetermined outside temperature to close another electrical circuit through the air delivery means and to make the cooling control thermostat available as a control device and to make the air delivery thermostat ineffective as a control device, and means including an auxiliary electric heater for the heat control thermostat and a relay contact controlled by said outside thermostat for energizing said auxiliary heater, whereby the functional setting of the heat control thermostat is lowered when the cooling control thermostat is made available as a control device.

8. An automatic temperature control apparatus comprising electrically energized means for delivering air into an enclosed space, means for heating the air, means for cooling the air, means including a heat control thermostat responsive to a predetermined maximum temperature in the space for controlling the delivery of heating medium to the air heating means, means including a cooling control thermostat responsive to a predetermined lower temperature within said space for energizing the air cooling means, a manually operable switch device for closing an energizing circuit through the air delivery means, an air delivery thermostat connected in parallel with the manually operable switch device and responsive to a predetermined temperature of the heated air to maintain the air delivery means effective when the manually operable switch device is opened and the delivered air is above a predetermined temperature and means including a thermostat responsive to a predetermined outside temperature to close another electrical circuit through the air delivery means and to make the cooling control thermostat available as a control device and to make the air delivery thermostat ineffective as a control device, means including an auxiliary electric heater for the heat control thermostat and a relay contact controlled by said outside thermostat for energizing said auxiliary heater, whereby the functional setting of the heat control thermostat is lowered when the cooling control thermostat is made available as a control device, and means comprising a relay controlled by the cooling control thermostat and made operative upon the functioning of this thermostat to close an additional heating circuit through said auxiliary heater.

9. An automatic temperature control apparatus comprising a radiator for delivering heat directly into an enclosed space, electrical means including a direct heat control thermostat responsive to the temperature within said space for controlling the delivery of heating medium to said radiator, an auxiliary heater for the direct heat control thermostat, an electrically energized means for delivering air into said space, means for heating the air prior to its delivery into said space, means including an air heater control thermostat responsive to the temperature within said space and a relay controlled thereby for controlling the flow of heating medium to the air heater, means connected through said relay to be effective for energizing said auxiliary heater when the air heat control is satisfied, whereby the direct heat control thermostat is dominated by the functioning of the air heater control thermostat, a thermostat responsive to the temperature of the delivered air for mainaining an energizing circuit through the air delivery means when the said air temperature is maintained above a predetermined minimum, means including a thermostat responsive to a predetermined outside temperature to make said air delivery thermostat ineffective, and other means controlled by said outside temperature responsive thermostat for reducing the functional setting of said air heater control thermostat and thereby indirectly dominating the direct heat control thermostat.

TIMOTHY J. LEHANE.

REFERENCES CITED

The following references are of record in the file of this patent:

UNITED STATES PATENTS

| Number | Name | Date |
| --- | --- | --- |
| 2,177,596 | Haines | Oct. 24, 1939 |
| 2,182,449 | Parks et al. | Dec. 5, 1939 |
| 2,346,592 | Lehane et al. | Apr. 11, 1944 |